United States Patent [19]

MacFarland, Jr.

[11] 3,874,976

[45] Apr. 1, 1975

[54] GRIPPER JAW ASSEMBLY

[75] Inventor: Raymond MacFarland, Jr., Novelty, Ohio

[73] Assignee: Computron, Inc., Valleyview, Ohio

[22] Filed: Feb. 2, 1973

[21] Appl. No.: 328,943

[52] U.S. Cl................... 156/515, 72/294, 72/342, 156/251, 156/256, 156/517, 156/518, 156/530, 156/553, 156/583
[51] Int. Cl.......................................... B32b 31/00
[58] Field of Search.......... 156/515, 517, 518, 530, 156/553, 583, 383, 251, 256; 72/394, 342

[56] References Cited
UNITED STATES PATENTS

| | | | |
|---|---|---|---|
| 2,999,532 | 9/1961 | Bursak | 156/510 |
| 3,340,129 | 9/1967 | Grevich | 156/515 |
| 3,441,460 | 4/1969 | Carmichael | 156/251 |
| 3,451,870 | 6/1969 | Pearson | 156/515 X |
| 3,493,456 | 2/1970 | Vilutis | 156/515 |
| 3,574,039 | 4/1971 | Fehr et al. | 156/515 |
| 3,775,225 | 11/1973 | Schott | 156/583 |

*Primary Examiner*—Clifton B. Cosby
*Attorney, Agent, or Firm*—Woodling, Krost, Granger & Rust

[57] ABSTRACT

An apparatus for cutting and sealing plastic material is disclosed including a gripper, a sealer and a cutter to make two parallel seals with a cut therebetween. The apparatus can automatically seal counted articles into individual packages and sever the packages into individual bags. The apparatus is suitable for use with automatic counting machines. The foregoing abstract is merely a resume of one general application, is not a complete discussion of all principles of operation or applications, and is not to be construed as a limitation on the scope of the claimed subject matter.

13 Claims, 13 Drawing Figures

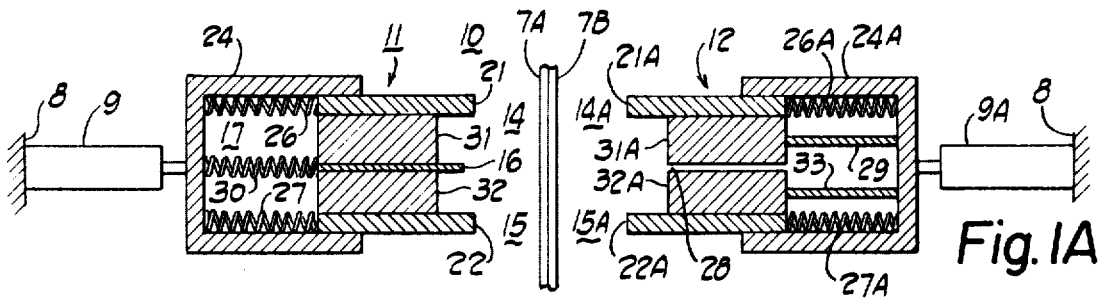
Fig. IA
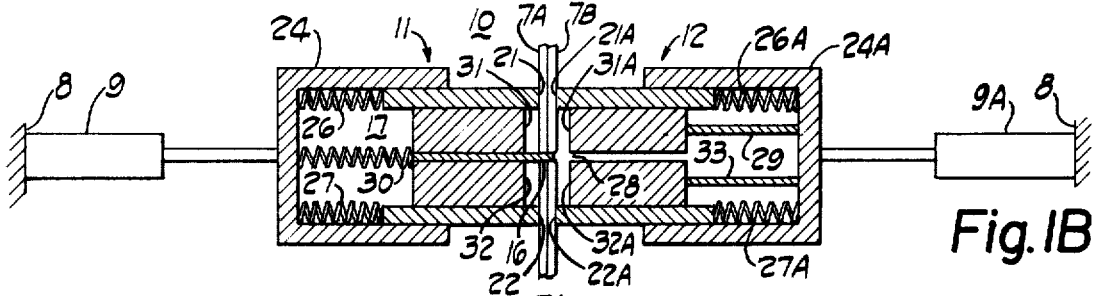
Fig. IB
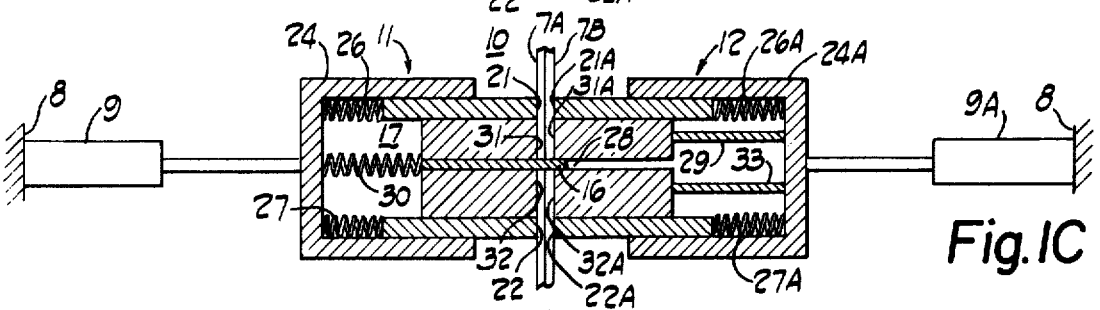
Fig. IC
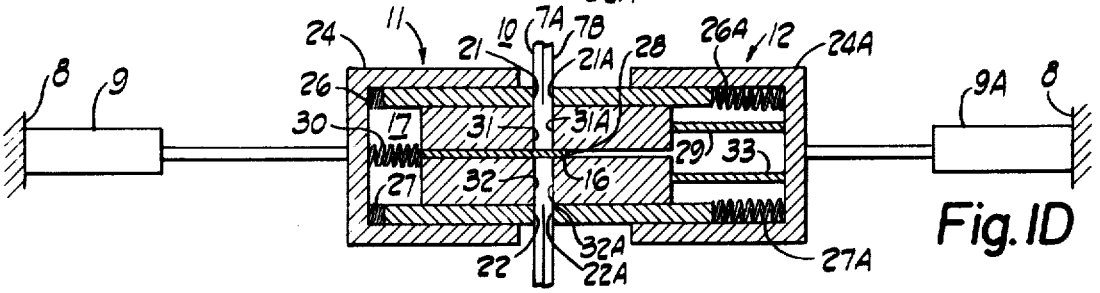
Fig. ID
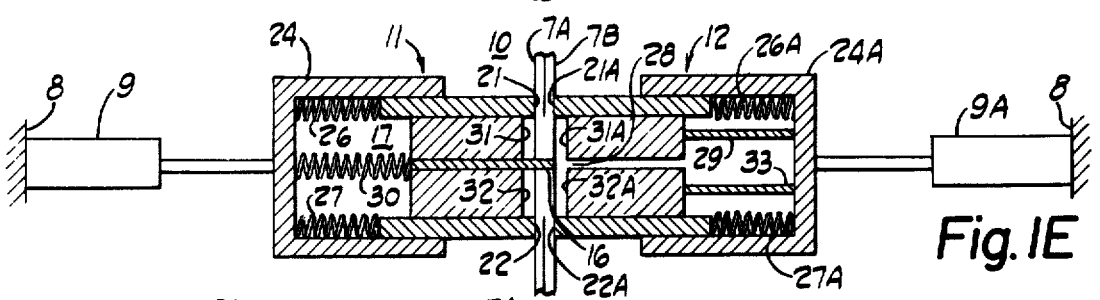
Fig. IE
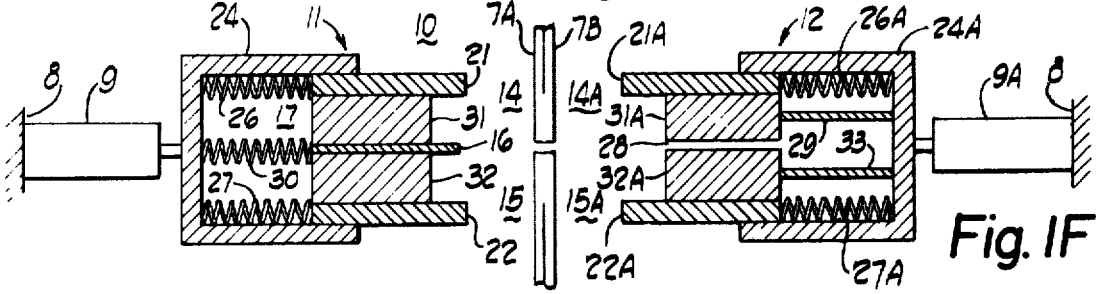
Fig. IF

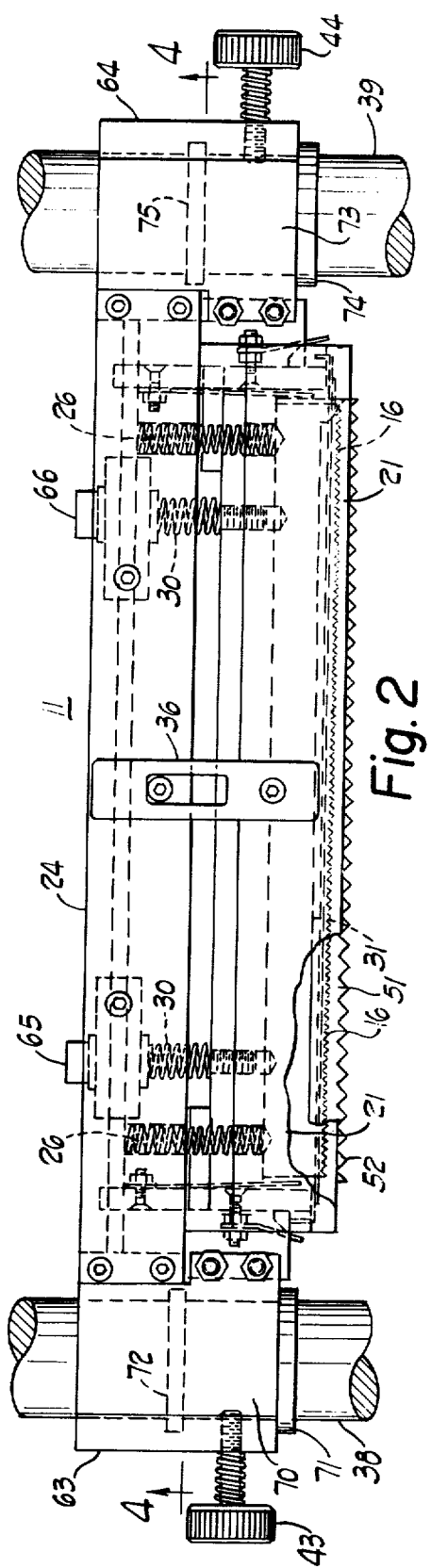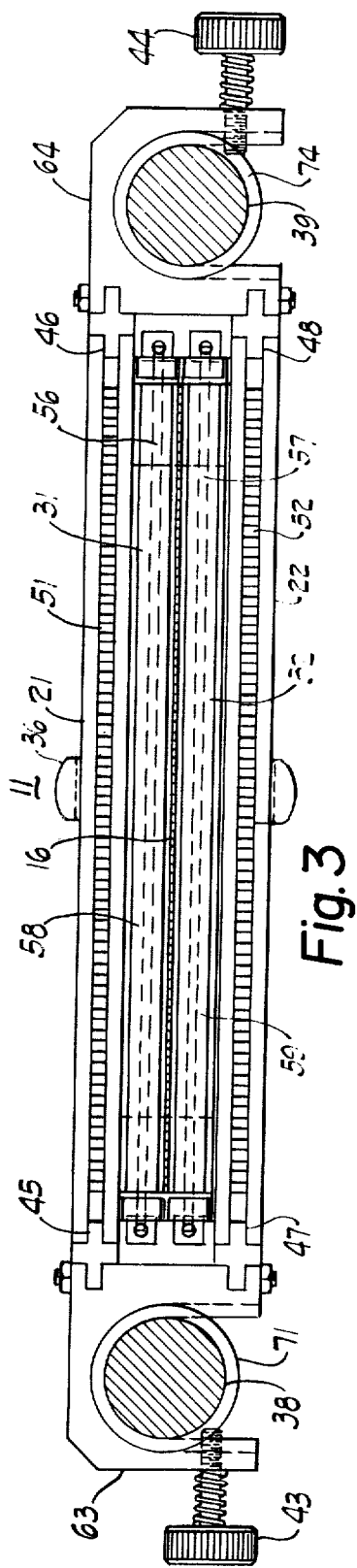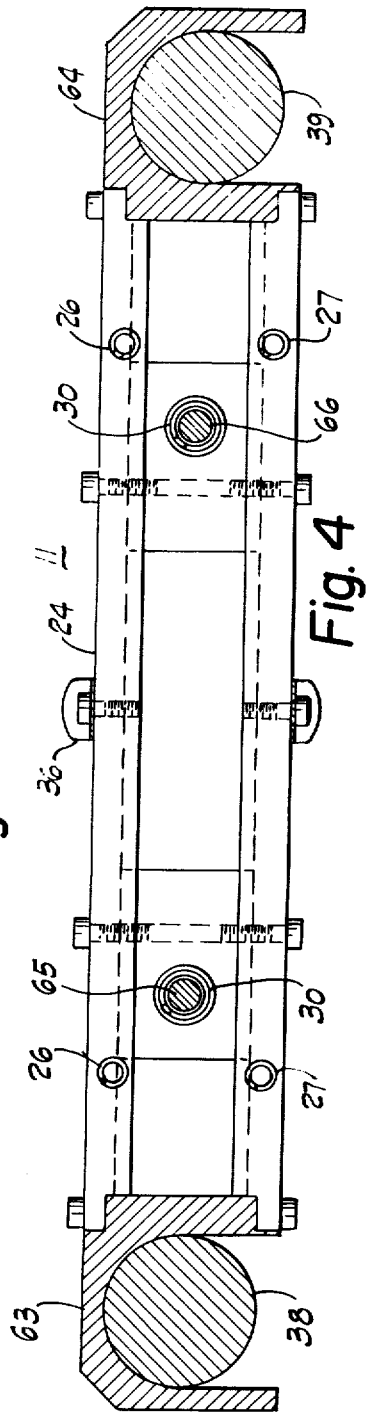

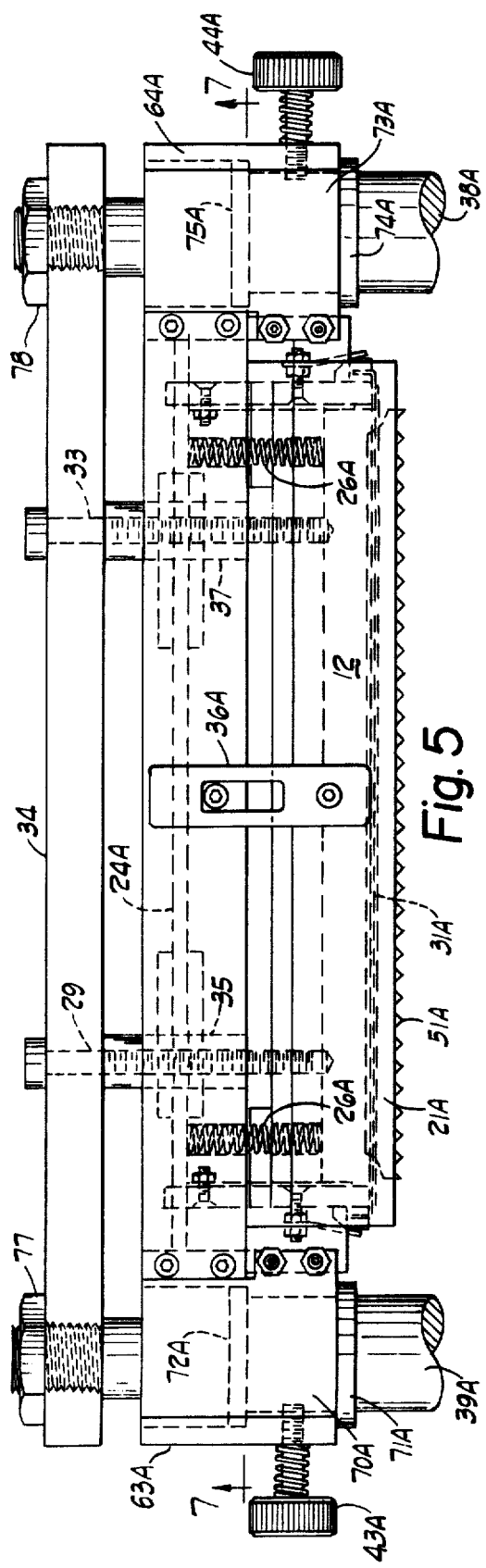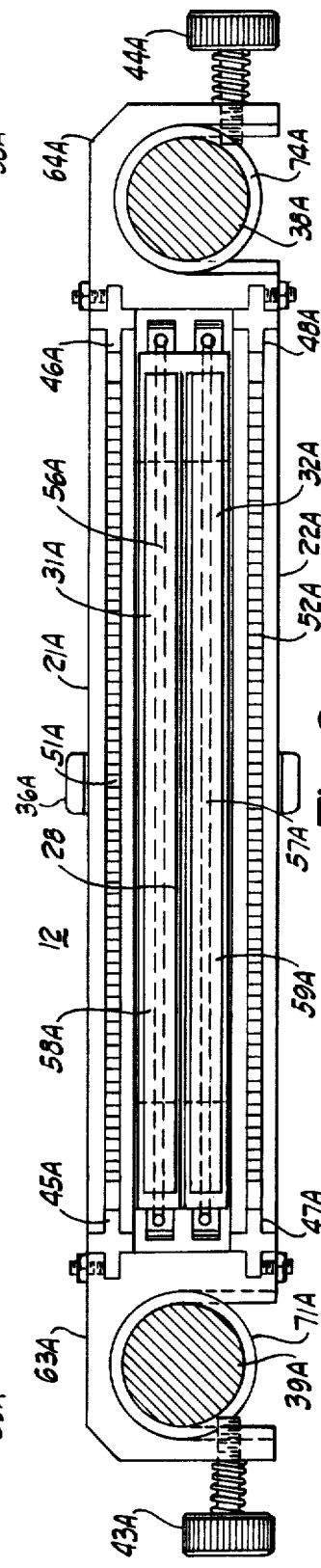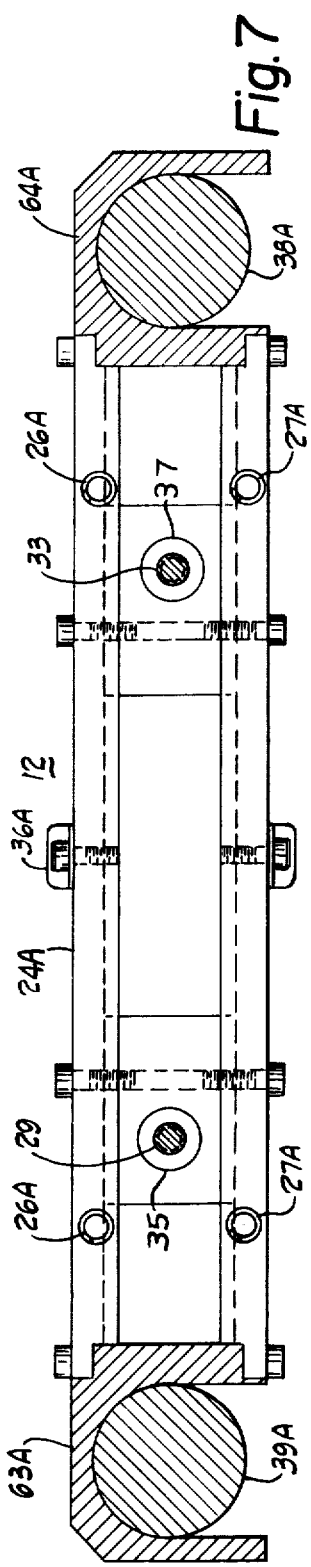

GRIPPER JAW ASSEMBLY

BACKGROUND OF THE INVENTION

The invention relates to electric heating and more particularly to electric heating with combined pressure application means.

The prior art has known many types of devices to cut and seal material such as plastic and the like. The recent trend has been to incorporate a sealing apparatus into an automatic counting machine to package small articles such as nuts and bolts and to seal the counted articles into individual plastic bags or containers. The sealing machines of the prior art had the disadvantage of requiring a substantial warm up time. Consequently, the first 10 to 20 bags produced had inferior seals due to the fact that the machine had not achieved a proper operating temperature. Another disadvantage of the prior art sealing machines was that often the bag failed to properly release from the sealing surface when packaging light weight articles. If the release was improperly made, the bag would stick to the sealing surface and interfere with the sealing of the next bag. The packaged parts of the sticking bag often caused damage to the sealing assembly. In many of the prior art sealing devices, the package seal had to withstand the stress caused by the dropping articles which fill the package. The prior art machines had no provision for using the sealing assembly to damp or reduce the stress on the package seal caused by dropping articles filling the package. The prior art machines also had a separate cutting apparatus to sever the sealed packages into separate bags. A separate cutting apparatus had the disadvantage that the cutting had to be indexed to the sealing to cut the material in the proper place. This added to the complexity of the prior art sealing and cutting apparatuses.

Therefore, an object of this invention is to produce an apparatus for cutting and sealing material which does not require a substantial warm-up time.

Another object of this invention is to produce a cutting and sealing apparatus having grippers to insure proper release from the sealing surface.

Another object of this invention is to produce a cutting and sealing apparatus wherein the cutting blade is an associated part of the cutting and sealing apparatus.

Another object of this invention is to produce a cutting and sealing apparatus which eliminates the shock to the sealed material caused by dropping articles.

Another object of this invention is to produce a cutting and sealing apparatus which is reliable.

Another object of this invention is to produce a cutting and sealing apparatus which is inexpensive.

SUMMARY OF THE INVENTION

The invention may be incorporated in an apparatus for cutting and sealing a sealable material, comprising, in combination, a frame, jaw means, means for mounting said jaw means to said frame, said jaw means including gripper means, sealer means, cutter means, means for interconnecting said gripper and sealer and cutter means as a part of said jaw means, means for moving said jaw means relative to said frame, and means for establishing relative movement between said gripper and sealer and cutter means to grip the material prior to cutting and sealing and to continue said grip subsequent to cutting and sealing the material.

Other objects and a fuller understanding of the invention may be had by referring to the following description and claims, taken in conjunction with the accompanying drawing.

BRIEF DESCRIPTION OF THE DRAWINGS

FIG. 1 is a side sectional view of the operation of a cutting and sealing apparatus;

FIG. 2 is a top view of the first sealer jaw shown in FIG. 1;

FIG. 3 is a front view of the sealer jaw shown in FIG. 2;

FIG. 4 is a sectional view on line 4—4 of the sealer jaw shown in FIG. 2;

FIG. 5 is a top view of the second sealer jaw shown in FIG. 1;

FIG. 6 is a front view of the sealer jaw shown in FIG. 5;

FIG. 7 is a sectional view on line 7—7 of the sealer jaw shown in FIG. 5; and,

DESCRIPTION OF THE PREFERRED EMBODIMENT

Figure 8:
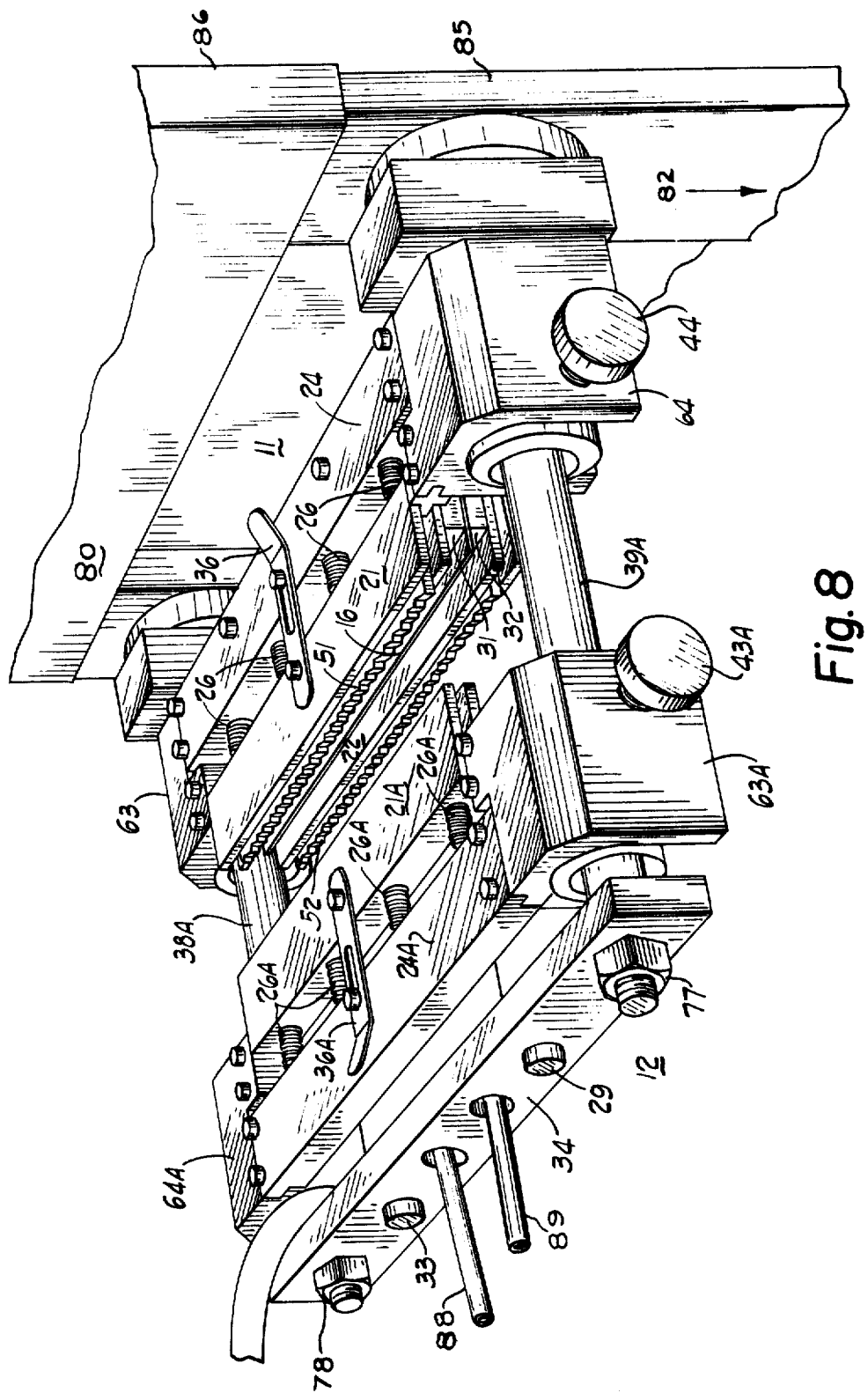
FIG. 8 is a perspective view of the sealer jaw assembly shown in FIGS. 2–7.

FIG. 1A–F illustrates the operation of an apparatus for cutting and sealing a sealable material 7A and 7B which includes a frame 8, jaw means shown generally as 10 and means 9 and 9A shown as hydraulic or air cylinders for mounting the jaw means 10 to the frame 8. The jaw means 10 includes first and second jaw means 11 and 12 each of which has gripper means 14 and sealer means 15. The invention includes means for interconnecting the gripper means 14, sealer means 15 and cutter means 16 as a part of the first jaw means 11. The cylinder 9 moves the first jaw means 11 relative to the frame 8 and cooperates with resilient means shown generally as 17 to establish relative movement between the gripper means 14 and the sealer means 15 to grip the material 7A and 7B prior to sealing and to continue the grip subsequent to sealing the material 7A and 7B. The first jaw means 11 has first and second gripper means 21 and 22 as part of gripper means 14 and first and second sealer means 31 and 32 as part of the sealer means 15. The first jaw means 11 includes the cutter means 16 shown as a cutter blade which is established between the first and second sealer means 31 and 32 which in turn are established between the first and second gripper means 21 and 22. The gripper means 14 and the sealer means 15 are independently slidably mounted to a jaw support 24. The resilient means 17 is established between the gripper means 14 and the sealer means 15 and is shown in this embodiment to include springs 26 and 27 established between the first and second gripper means 21 and 22 and a jaw support 24 and a spring 30 establilshed between the first and second sealer means 31 and 32 and the jaw support 24. First and second sealer means 31 and 32 are established to be recessed from the first and second gripper means 21 and 22 with the cutter blade 16 extending from and located between the first and second sealer means 31 and 32 but recessed from the first and second gripper means 21 and 22. The second jaw means 12 is connected to the frame 8 by the cylinder 9A and includes gripper means 14A and sealer means 15A shown as first and second gripper means 21A and 22A and first and second sealer means 31A and 32A. The second jaw means 12 has a provision shown as a groove 28 which is able to accommodate a portion of the cutter blade 16 to cut the plastic material 7A and 7B. The first and second gripper means 21A and 22A are slidably mounted to a jaw support 24A and are also resiliently mounted to the jaw support 24A by springs 26A and 27A. The first and second sealer means 31A and 32A are fixedly attached to the jaw support 24A by mounting supports 29 and 33.

The operation of the sealer jaw assembly shown in FIG. 1 can best be appreciated by the sequence shown in FIGS. 1A-1F. FIG. 1A illustrates a standby position with the plastic material 7A and 7B located between the first and second jaw means 11 and 12. In FIG. 1B, the cylinders 9 and 9A have moved the first and second jaw means 11 and 12 such that the first and second gripper means of the first and second jaw means resiliently grip the plastic material 7A and 7B upon compression of the springs 27, 27A, 27 and 27A. Shortly thereafter, the cutter blade 16 severs the plastic material 7A and 7B while the first gripper means 21 and 21A grip the top portion of the plastic material 7A and 7B and the second gripper means 22 and 22A grip the bottom portion of the plastic material 7A and 7B. As the cylinders 9 and 9A continue to move the jaw means 11 and 12 towards one another, the first and second sealer means 31, 31A, 32 and 32A engage with the plastic material 7A and 7B as shown in FIG. 1C. Additional movement of the first and second jaw means 11 and 12 compress the springs 26, 26A, 27 and 27A of the gripper means 14 and 14A and the spring 30 of the sealer means 15 of the first jaw means 11. The sealer means 15A of the second jaw means 12 is fixed to the jaw support 24A by the mounting supports 29 and 33 and consequently the movement of the sealer means 15A of the second jaw means 12 toward the sealer means 15 of the first jaw means 11 deforms the spring 30. Simultaneously the first and second sealer means 31, 31A, 32 and 32A apply heat to the plastic material 7A and 7B to seal the material in the region of the first and second sealer means as shown in FIG. 1D. After the cutting and sealing process has been completed as shown in FIG. 1D, the first and second jaw means 11 and 12 retract with the aid of the cylinders 9 and 9A. FIG. 1E illustrates a position of retraction similar to FIG. 1B after completion of the cutting and sealing process. The first and second gripper means 21, 21A, 22 and 22A are still resiliently gripping the plastic material 7A and 7B during the retraction of the first and second sealer means 31, 31A, 32 and 32A of the first and second jaw means 11 and 12. The gripping of the plastic material 7A and 7B subsequent to the retraction of the sealer means 31, 31A, 32 and 32A enables a proper release between the plastic material 7A and 7B and the first and second sealer means 31, 31A, 32 and 32A. FIG. 1F illustrates a position of the gripper means 14 and 14A and sealer means 15 and 15A after the first and second jaw means 11 and 12 have been completely withdrawn to a position similar to that shown in FIG. 1A. The plastic material 7A and 7B has been cut between two substantially parallel seals.

FIG. 2 is a top view of the first jaw means 11 having mountings 63 and 64 at the extremities of the jaw means 11 for engagement with rods 38 and 39 of the cylinder 9 shown in FIG. 1. The rods 38 and 39 have collars 70 and 73, respectively, to secure the jaw means 11 to the rods 38 and 39. The collar 70 has enlarged portions 71 and 72 to cooperate with the mounting 63 and with a screw 43 to fix the mounting 63 relative to the rod 38. The collar 73 has enlarged portions 74 and 75 which cooperate with the mounting 64 and with a screw 44 to fix the mounting 64 relative to the rod 39. The mountings 63 and 64 are fixed to the jaw support 24 by a plurality of fasteners shown as screws.

The first gripper means 21 is shown having a gripping surface 51 which can be an elastic material such as rubber or the like and is shown to be serrated to improve the release of the plastic material. Serration of the gripping surface 51 allows the release of the plastic material. without requiring the aid of the weight of the packaged articles. This eliminates many of the problems encountered in the prior art sealing machines wherein release was only available when the plastic material such as a bag was filled with heavy packaged articles. The sealing apparatus of this invention can release a plastic material such as a bag without any articles inside and with only the weight of the bag.

The gripper means 21 is mounted on slides 45-48 shown in FIG. 3 with the springs 26 urging the gripper means 21 to extend out from the jaw support 24 which movement is limited by a stop 36. When the gripper means 21 encounters resistance during movement of the first jaw means 11, the gripper means 21 compresses the springs 26 to apply resilient pressure on the resistance. The cutter blade 16 is shown recessed from the gripper 21 and the gripping surface 51 and is fixed to the sealer means 31 which sealer means is recessed from the cutter blade 16. The first and second sealer means 31 and 32 are shown as a single unit mounted to the jaw support 24 by screws 65 and 66 and spring loaded to the jaw support 24 by the springs 30. When the sealer means 31 and 32 encounter resistance during movement of the first jaw means 11, the springs 30 are deformed to apply resilient pressure on the resistance.

FIG. 3 is a front view of the sealer assembly shown in FIG. 2 showing the first and second gripper means 21 and 22 to be substantially identical to one another with the second gripper means 22 having a gripping surface 52A. The first and second sealer means 31 and 32 are illustrated as a common structure wherein the structure is spring loaded by the springs 30. The first and second sealer means 31 and 32 have heater elements 56 and 57 shown as wire ribbons such as nichrome wire which is stretched the length of the sealer means 31 and 32. The heater elements 56 and 57 are covered by release agents 58 and 59 such as teflon or the like.

FIG. 4 is a sectional view of FIG. 2 showing the first gripper means 21 to be individually spring-loaded by the top springs 26 whereas the second gripper means 22 is individually spring-loaded by the bottom springs 27.

FIG. 5 shows the second jaw means 12 which includes mountings 63A and 64A to cooperate with rods 39A and 38A of the cylinder 9A shown in FIG. 1. A back support 34 is fixed to the rods 38A and 39A by nuts 78 and 77, respectively. The mounting 63A has a recess to accommodate a collar 70A having enlarged portions 71A and 72A and the mounting 64A likewise has a recess to accommodate a collar 73A having enlarged portions 74A and 75A. Screws 43A and 44A secure the mountings 63A and 64A to the rods 39A and 38A which mountings 63A and 64A are fixed to the jaw support 24A. The first gripper means 21A is shown having an elastice gripping surface 51A and which is shown spring-loaded to the jaw support 24A by the springs 26A. The movement of the gripper means 21A is limited by a stop 36A. The gripping surface 51A may be serrated in a manner similar to the gripping surface 51 but the inventor has discovered that the use of a serrated elastic gripping surface in conjunction with a smooth elastic gripping surface is superior in many applications. The sealer means 31A is spatially fixed to the back support 34 by the mounting supports 29 and 33 and spacers 35 and 37.

FIG. 6 is a front view of the second jaw means 12 shown in FIG. 5 showing in greater detail the construction of the first and second gripper means 21A and 22A and the first and second sealer means 31A and 32A. The first and second gripper means 21A and 22A are slidably mounted to the mountings 63A and 64A by slides 45A–48A. The second gripper means 22A has a gripping surface 52A to cooperate with the gripping surface 52. The sealer means 31A and 32A are shown including heater elements 56A and 57A covered by release agents 58A and 59A, respectively. The groove 28 accommodates a portion of the cutter blade 16 to sever the plastic material 7A and 7B and comprises part of the cutter means in this invention.

FIG. 7 is a sectional view on line 7—7 of the apparatus shown in FIG. 5. The first gripper means 21A is mounted by the springs 26A whereas the second gripper means 22A is mounted by the springs 27A to the jaw support 24A. The first and second sealer means 31A and 32A are supported by the mounting supports 29 and 33. The second jaw means 12 has resiliency incorporated between the first and second gripper means 21A and 22A and the jaw support 24A but the first and second sealer means 31A and 32A are fixedly attached to the back support 34 by the mounting supports 29 and 33. However, the invention can incorporate resiliency between the first and second sealer means 31A and 32A and the jaw support 24A of the second jaw means 12. In addition, the invention can incorporate variations wherein the first and second gripper means are suspended by a single resiliency or the first and second sealer means are individually suspended by springs or the like and it is understood that the term springs can be any resilient material. All of the above variations are considered to be within the scope of this invention.

FIG. 8 is an isometric view of the jaw means mounted to a machine 80 wherein the first jaw means 11 is the rear jaw and the second jaw means 12 is the front jaw relative to the machine 80. The mountings 63 and 64 of the first jaw means 11 are attached to the outer portion of a double-acting cylinder which is contained within the machine 80 whereas the mountings 63A and 64A of the second jaw means 12 are attached to the inner portion or rods 38A and 39A of the double acting cylinder. The double-acting cylinder is illustrated schematically in FIG. 1 as two cylinders 9 and 9A. The cylinder and the first and second jaw means 11 and 12 are mounted on a slide 85 which slide is vertically movable relative to a fixed portion 86 of the machine 80. The slide 85 is shown in the top position of movement in FIG. 8. When the cylinder is energized, the first and second jaw means 11 and 12 move towards one another to resiliently grasp the plastic material. As the cylinder continues to move, the cutter blade 16 severs the plastic material being gripped by the first and second gripper means of the first and second jaw means 11 and 12 in a manner as illustrated in FIG. 1. Additional movement of the cylinder causes movement of the sealing means of the first and second jaw means 11 and 12 to resiliently engage the plastic material and upon engagement to apply electric current to the heating elements to seal the plastic material. Concomitantly, with the movement of the sealer means, the slide 85 including the first and second jaw means 11 and 12 moves in a vertical direction as indicated by an arrow 82 to advance the plastic material to a bottom position. Upon release by the first and second jaw means 11 and 12, the severed plastic material will fall and the remaining plastic material will have a bottom seal. For example, assume that a tubular plastic material is being sealed and the slide 85 is in the top position. The first gripper means 21 and 21A will be gripping a top portion of the plastic material whereas the second gripper means 22 and 22A will be gripping a bottom portion of the plastic material. While slide 85 is in the top position, counted articles can be dropped with the first gripper means 21 and 21A absorbing the shock of the falling articles. The plastic material is then cut, sealed and advanced to the bottom position by action of the jaw means 11 and 12. The jaw means 11 and 12 will open in the bottom position and move upwardly and opposed to the arrow 82 to the top position so that the articles to be packaged are below the jaw means 11 and 12. The jaw means 11 and 12 again close to grasp and sever the plastic material above the articles to be packaged. At this time, additional articles are filled into the plastic material above the first gripper means 21 and 21A. The jaw means 11 and 12 move down in a vertical direction shown by the arrow 82 to advance the material and apply electrical current to seal the top seam of the bag containing the articles and the bottom seam of the next subsequent bag by the sealer means 31, 31A and 32, 32A, respectively. When the slide 82 is in the bottom position, the jaw means 11 and 12 open to release the completed bag and again move upwardly to the top position to seal the next subsequent bag. In the embodiment shown, tubing conduits 88 and 89 are provided in the second jaw means 12 to cool the sealer means and similar provisions are included but not shown in the first jaw means 11.

Although the first and second jaw means has been described as a cutting and sealing apparatus, it is understood that the invention can be practiced by gripper means incorporated with sealing means or gripper means incorporated with cutting means. The inter-relation of the jaw means and the cutter means or the inter-relation of the jaw means and the sealer means to establish relative movement therebetween is the subject matter of this invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for cutting and sealing a sealable material, comprising in combination:
    a frame;

jaw means;
means for mounting said jaw means to said frame;
said jaw means including,
gripper means,
sealer means,
cutter means,
means for interconnecting said gripper and sealer and cutter means as a part of said jaw means;
means for moving said jaw means relative to said frame;
means for establishing relative movement between said gripper and sealer and cutter means to grip the material prior to cutting and sealing and to continue said grip subsequent to cutting and sealing the material,
and advancing means for moving said jaw means in a direction transverse to the direction of said means for relatively moving said gripper and sealer and cutter means to advance the material.

2. An apparatus for cutting and sealing a sealable material, comprising in combination:
a frame;
jaw means;
means for mounting said jaw means to said frame;
said jaw means including,
gripper means,
sealer means,
cutter means,
means for interconnecting said gripper and sealer and cutter means as a part of said jaw means,
said means for interconnecting including resilient means acting between said gripper means and said scaler means;
means for moving said jaw means relative to said frame to resiliently grip the material and to move said cutter and sealer means to cut and seal the material.
and advancing means for moving said jaw means in a direction transverse to the direction of said means for moving said jaw means to advance the material.

3. An apparatus for cutting and sealing a sealable material, comprising in combination:
a frame,
a jaw support,
means for mounting said jaw support to said frame,
gripper means,
means for mounting said gripper means to said jaw support,
cutter means,
sealer means,
means for mounting said cutter means and said sealer means to said jaw support.
resilient means acting between said gripper means and said sealer means.
means for moving said jaw support relative to said frame to resiliently grip the material with said gripper means and to move said cutter and sealer means to cut and seal the material,
and advancing means for moving said jaw support in a direction transverse to the direction of said means for moving said jaw support to advance the material while being gripped by said gripper means.

4. An apparatus for cutting and sealing a heat sealable material, comprising in combination:
a frame,
a jaw support,
means for mounting said jaw support to said frame,
gripper means,
means for mounting said gripper means to said jaw support,
cutter means,
first and second sealer means having, heating means,
means for mounting said cutter means and said first and second sealer means to said jaw support to be recessed from said gripper means,
resilient means acting between said gripper means and said sealer means,
means for moving said jaw support relative to said frame to grip the material with said gripper means upon movement of said jaw support and to deform said resilient means to move said cutter and sealer means relative to said gripper means to cut and to plurally seal the heat sealable material,
and advancing means for moving said jaw support in a direction transverse to the direction of said means for moving said jaw support to advance the material while being gripped by said gripper means.

5. An apparatus for sealing a material, comprising in combination:
a frame,
first and second gripper means,
means for mounting said first and second gripper means to said frame,
sealer means,
means for mounting said sealer means to be recessed from said first and second gripper means,
means for moving one of said first and second gripper means to hold the material taut between said first and second gripper means and to move said sealer means relative to said gripper means to subsequently seal the material with said sealer means,
and advancing means for moving said gripper means in a direction transverse to the direction of said means for moving one of said gripper means to advance the material.

6. An apparatus for sealing a sealable material, comprising in combination.
a frame;
jaw means;
means for mounting said jaw means to said frame;
said jaw means including,
gripper means,
sealer means,
means for interconnecting said gripper and sealer means as a part of said jaw means,
said means for interconnecting including resilient means acting between said gripper means and said sealer means;
means for moving said jaw means relative to said frame to resiliently grip the material and to move said sealer means to seal the material,
and advancing means for moving said jaw means in a direction transverse to the direction of said means for moving said jaw means to advance the material.

7. An apparatus for sealing a sealable material, comprising in combination:
a frame;
first and second jaw means;
each of said jaw means including,
a jaw support,
first and second gripper means, means for resiliently mounting said first and second gripper means to said jaw support, said jaw means including sealer means, means for mounting said sealer means to said first jaw means to be recessed from said first and second gripper means of said first jaw means;

means for mounting said first and second jaw means to said frame;

means for moving one of said first and second jaw means to grip the material between said first gripper means of said first and second jaw means and between said second gripper means of said first and second jaw means and to deform said resilient mounting of said gripper means to seal the material, and advancing means for moving said jaw support in a direction transverse to the direction to said means for moving one of said first and second jaw means to advance the material while being gripped by said gripper means.

8. An apparatus as set forth in claim 7, wherein said gripper means includes a serrated gripping surface.

9. An apparatus as set forth in claim 8, wherein said gripping surface is an elastic material.

10. An apparatus for cutting material, comprising in combination:

a frame;

jaw means;

means for mounting said jaw means to said frame;

said jaw means including, gripper means, cutter means, means for interconnecting said gripper and cutter means as a part of said jaw means;

means for moving said jaw means relative to said frame;

means for establishing relative movement between said gripper and cutter means to grip the material prior to cutting and to continue said grip subsequent to cutting the material, and advancing means for moving said jaw means in a direction transverse to the direction of said means for establishing relative movement between said gripper and cutter means to advance the material.

11. An apparatus for cutting material, comprising in combination:

a frame;

jaw means;

means for mounting said jaw means to said frame;

said jaw means including, gripper means, cutter means, means for interconnecting said gripper and cutter means as a part of said jaw means, said means for interconnecting including resilient means acting between said gripper means and said cutter means;

means for moving said jaw means relative to said frame to resiliently grip the material and to move said cutter means to cut the material, and advancing means for moving said jaw means in a direction transverse to the direction of said means for moving said jaw means to advance the material.

12. An apparatus for cutting material, comprising in combination:

a frame;

first and second jaw means;

each of said jaw means including, a jaw support, first and second gripper means, said gripper means being an elastic material and including a serrated gripping surface, means for resiliently mounting said first and second gripping means to said jaw support, said jaw means including cutter means, means for mounting said cutter means to said first jaw means to be recessed from said first and second gripper means of said first jaw means;

means for mounting said first and second jaw means to said frame;

first means for moving one of said first and second jaw means to grip the material between said first gripper means of said first and second jaw means and between said second gripper means of said first and second jaw means and to deform said resilient mounting of said gripper means to cut the material with said cutter means, and second means for moving said first and second jaw means transverse to the movement of said first means to advance the material while being gripped by said first and second gripper means.

13. An apparatus for cutting and sealing plastic material, comprising in combination:

a frame, first and second jaw means;

each of said jaw means including, a jaw support, first and second gripper means slidably mounted to said jaw support, said gripper means having a serrated gripping surface of an elastic material, gripper resilient means mounted between said first and second gripper means and said jaw support, first and second sealer means sidably mounted to said jaw support between said first and second gripper means and recessed from said gripping surface of said first and second gripper means, said sealer means including a resistive heaeting element and a heat transmissive release member, said release member being established to cover said heating element to form a sealing surface;

sealer resilient means mounted between said first and second sealer means and said jaw support of said first jaw means;

a cutter blade;

means for mounting said cutter blade between the first and second sealer means of said first jaw means to protrude from the sealing surface of said first and second sealer means;

means establishing said second jaw means to cooperate with a portion of said cutter blade between said first and second sealer means of said second jaw means;

means for mounting said first and second jaw means to said frame;

first means for moving one of said first and second jaw means the plastic material between said first griipper means of said first and second jaw means and between said second gripper means of said first and second jaw means and to compress said gripper resilient means to move said cutter blade of said first jaws means into said second jaw means to cut the plastic material and to engage said sealing surfaces to seal the plastic material between the first sealer means of said first and second jaw means and between said second sealer means of said first and second jaw means;

and second means for moving said first and second jaw means in a direction transverse to the movement of said first moving means to advance the plastic material while being gripped by said first and second gripper means.

* * * * *